(12) United States Patent
Georgelos et al.

(10) Patent No.: US 10,875,694 B2
(45) Date of Patent: Dec. 29, 2020

(54) CO-INJECTION MOLDED DISPENSING COMPONENTS METHOD

(71) Applicant: DS Smith Plastics Limited, London (GB)

(72) Inventors: Paul N. Georgelos, Naperville, IL (US); Mark A. Smith, Plainfield, IL (US); Kosmas Kasimatis, Chicago, IL (US)

(73) Assignee: Corplex Plastics UK Ltd., Gloucester (GB)

( * ) Notice: Subject to any disclaimer, the term of this patent is extended or adjusted under 35 U.S.C. 154(b) by 143 days.

(21) Appl. No.: 16/196,412

(22) Filed: Nov. 20, 2018

(65) Prior Publication Data

US 2019/0084741 A1 Mar. 21, 2019

Related U.S. Application Data

(62) Division of application No. 15/165,836, filed on May 26, 2016, now Pat. No. 10,160,583.

(Continued)

(51) Int. Cl.
*B65D 75/58* (2006.01)
*B29C 45/16* (2006.01)
(Continued)

(52) U.S. Cl.
CPC ...... *B65D 75/5877* (2013.01); *B29C 45/1657* (2013.01); *B29C 45/1676* (2013.01); *B29C 45/1679* (2013.01); *B29C 49/04* (2013.01); *B29C 49/06* (2013.01); *B29C 2045/1659* (2013.01); *B29K 2021/003* (2013.01); *B29K 2023/04* (2013.01); *B29K 2025/08* (2013.01); *B29L 2031/7128* (2013.01); *B65D 47/06* (2013.01); *B65D 47/063* (2013.01); *B65D 83/0055* (2013.01); *B65D 2547/066* (2013.01); *B67D 3/0067* (2013.01)

(58) Field of Classification Search
CPC ........ B65D 75/5877; B29C 2045/1659; B29C 45/1676; B29C 45/1679; B29C 49/06
See application file for complete search history.

(56) References Cited

U.S. PATENT DOCUMENTS

| 172,929 A | 2/1876 | Newton |
| 261,354 A | 7/1882 | Johnson |

(Continued)

FOREIGN PATENT DOCUMENTS

| GB | 1314429 | 4/1973 |
| GB | 1416816 | 12/1975 |

OTHER PUBLICATIONS

Patent Cooperation Treaty, Notification of Transmittal of the International Search Report and the Written Opinion of the International Searching Authority, or the Declaration, Application No. PCT/IB2016/000825, dated Nov. 10, 2016 (13 pages).

*Primary Examiner* — Jermie E Cozart
(74) *Attorney, Agent, or Firm* — McAndrews, Held & Malloy, Ltd.

(57) ABSTRACT

A present application relates to a dispensing component for use with an urn liner. The dispensing component includes a spout formed of a polyethylene material and a flexible tube formed of a thermoplastic elastomer material. The spout and tube are formed together as a single component in a mold by co-injection of the polyethylene material and the thermoplastic elastomer material.

4 Claims, 9 Drawing Sheets

Related U.S. Application Data

(60) Provisional application No. 62/167,134, filed on May 27, 2015.

(51) Int. Cl.
| | |
|---|---|
| *B29C 49/06* | (2006.01) |
| *B65D 47/06* | (2006.01) |
| *B65D 83/00* | (2006.01) |
| *B29C 49/04* | (2006.01) |
| *B67D 3/00* | (2006.01) |
| *B29L 31/00* | (2006.01) |
| *B29K 21/00* | (2006.01) |
| *B29K 25/00* | (2006.01) |

(56) References Cited

U.S. PATENT DOCUMENTS

| | | |
|---|---|---|
| 2,377,261 A | 5/1945 | Norris |
| 2,425,500 A | 8/1947 | Wiggins |
| 2,549,207 A | 4/1951 | Kestenbaum |
| 2,597,250 A | 5/1952 | Kollsman |
| 2,601,319 A | 6/1952 | Norris et al. |
| 2,606,709 A | 8/1952 | Carey et al. |
| 2,681,747 A | 6/1954 | Norris et al. |
| 2,706,646 A | 4/1955 | Olson |
| 2,718,985 A | 9/1955 | Tamminga |
| 2,815,887 A | 12/1957 | Ford et al. |
| 2,816,690 A | 12/1957 | Lari |
| 2,823,846 A | 2/1958 | George |
| 2,831,610 A | 4/1958 | Dennie |
| 2,861,718 A | 11/1958 | Winzen |
| 2,905,560 A | 9/1959 | Bender et al. |
| 2,927,522 A | 3/1960 | Rockwood et al. |
| 3,081,911 A | 3/1963 | Scholle |
| 3,087,655 A | 4/1963 | Scholle |
| 3,089,622 A | 5/1963 | Westlake, Jr. |
| 3,094,154 A | 6/1963 | Daniels |
| 3,096,912 A | 7/1963 | Rivette |
| 3,099,379 A | 7/1963 | Stease |
| 3,123,254 A | 3/1964 | Rabby et al. |
| 3,137,415 A | 6/1964 | Faunce |
| 3,138,293 A | 6/1964 | Roak et al. |
| 3,142,416 A | 7/1964 | Federighi |
| 3,171,571 A | 3/1965 | Daniels |
| 3,173,579 A | 3/1965 | Curie et al. |
| 3,178,063 A | 4/1965 | Cox, Jr. |
| 3,206,104 A | 9/1965 | Cohen |
| 3,212,681 A | 10/1965 | Weikert |
| 3,214,076 A | 10/1965 | Gagnon |
| 3,223,117 A | 12/1965 | Curie et al. |
| 3,234,965 A | 2/1966 | Anderson |
| 3,243,084 A | 3/1966 | Stegner |
| 3,253,764 A | 5/1966 | Goetschius et al. |
| 3,334,860 A | 8/1967 | Bolton, Jr. |
| 3,464,436 A | 9/1969 | Bruning |
| 3,513,887 A | 5/1970 | Limandri |
| 3,613,954 A | 10/1971 | Bayne |
| 3,638,834 A | 2/1972 | Goodrich et al. |
| 3,756,471 A | 9/1973 | Wissman |
| 3,871,404 A | 3/1975 | Courant |
| 3,905,541 A | 9/1975 | Paxton |
| 3,920,163 A | 11/1975 | Brown |
| 3,945,534 A | 3/1976 | Ady |
| 3,949,744 A | 4/1976 | Clarke |
| 3,972,387 A | 8/1976 | Braun |
| 3,976,277 A | 8/1976 | Basel et al. |
| 3,993,239 A | 11/1976 | Exel |
| 4,014,461 A | 3/1977 | Harvill |
| 4,044,989 A | 8/1977 | Basel et al. |
| 4,137,930 A | 2/1979 | Scholle |
| 4,138,036 A | 2/1979 | Bond |
| 4,146,070 A | 3/1979 | Angarola et al. |
| 4,165,024 A | 8/1979 | Oswalt et al. |
| 4,174,051 A | 11/1979 | Edwards et al. |
| 4,186,783 A | 2/1980 | Brandt |
| 4,257,535 A | 3/1981 | Mellett |
| 4,286,636 A | 9/1981 | Credle |
| 4,314,654 A | 2/1982 | Gaubert |
| 4,322,018 A | 3/1982 | Rutter |
| 4,325,496 A | 4/1982 | Malpas |
| 4,334,640 A | 6/1982 | van Overbruggen et al. |
| 4,353,488 A | 10/1982 | Schneiter et al. |
| 4,375,864 A | 3/1983 | Savage |
| 4,380,310 A | 4/1983 | Schneiter et al. |
| 4,421,146 A | 12/1983 | Bond et al. |
| 4,445,539 A | 5/1984 | Credle |
| 4,445,551 A | 5/1984 | Bond et al. |
| 4,475,670 A | 10/1984 | Rutter |
| 4,485,845 A | 12/1984 | Brady |
| 4,493,438 A | 1/1985 | Rutter |
| 4,513,885 A | 4/1985 | Hogan |
| 4,516,691 A | 5/1985 | Christine et al. |
| 4,516,692 A | 5/1985 | Croley |
| 4,516,693 A | 5/1985 | Gaston |
| 4,528,161 A | 7/1985 | Eckert |
| 4,549,577 A | 10/1985 | Kugler |
| 4,549,673 A | 10/1985 | Kupersmit |
| 4,557,508 A | 12/1985 | Walker |
| 4,564,132 A | 1/1986 | Lloyd-Davies |
| 4,570,826 A | 2/1986 | Fattori |
| 4,601,410 A | 7/1986 | Bond |
| 4,606,476 A | 8/1986 | Pocock et al. |
| 4,700,744 A | 10/1987 | Rutter et al. |
| 4,722,458 A | 2/1988 | Van Dal |
| 4,757,752 A | 7/1988 | Robins et al. |
| 4,785,974 A | 11/1988 | Rudick et al. |
| 4,793,494 A | 12/1988 | Gordon, Jr. |
| 4,796,788 A | 1/1989 | Bond |
| 4,813,518 A | 3/1989 | Akiyama et al. |
| 4,815,631 A | 3/1989 | Eeg et al. |
| 4,890,642 A | 1/1990 | Smazik et al. |
| 4,898,303 A | 2/1990 | Large et al. |
| 4,911,399 A | 3/1990 | Green |
| 4,948,014 A | 8/1990 | Rutter et al. |
| 4,960,227 A | 10/1990 | Coleman |
| 4,986,466 A | 1/1991 | Colby |
| 4,991,635 A | 2/1991 | Ulm |
| 5,054,644 A | 10/1991 | Greenslade |
| 5,064,096 A | 11/1991 | Illing et al. |
| 5,072,756 A | 12/1991 | Carr |
| 5,080,132 A | 1/1992 | Manz et al. |
| 5,095,962 A | 3/1992 | Lloyd-Davies et al. |
| 5,114,045 A | 5/1992 | Herpe |
| RE33,969 E | 6/1992 | Richter |
| 5,130,020 A | 7/1992 | Meckstroth |
| 5,143,278 A | 9/1992 | Petriekis et al. |
| 5,147,328 A | 9/1992 | Dragosits et al. |
| 5,186,359 A | 2/1993 | Brown et al. |
| 5,188,259 A | 2/1993 | Petit |
| 5,215,122 A | 6/1993 | Rogers et al. |
| 5,226,566 A | 7/1993 | Brandenburg |
| 5,249,716 A | 10/1993 | O'Sullivan |
| 5,255,713 A | 10/1993 | Scholle et al. |
| 5,265,753 A | 11/1993 | Moorman |
| 5,272,236 A | 12/1993 | Lai et al. |
| 5,297,696 A | 3/1994 | Bernstein et al. |
| 5,333,777 A | 8/1994 | Roth |
| 5,334,180 A | 8/1994 | Adolf et al. |
| 5,335,844 A | 8/1994 | Young |
| 5,385,268 A | 1/1995 | LaFleur et al. |
| 5,419,485 A | 5/1995 | Petriekis et al. |
| 5,427,284 A | 6/1995 | Inch |
| 5,445,186 A | 8/1995 | Richter et al. |
| 5,449,027 A | 9/1995 | Mueller |
| 5,516,693 A | 5/1996 | Vaeck et al. |
| 5,549,673 A | 8/1996 | Beale |
| 5,551,602 A | 9/1996 | Kurtzahn et al. |
| 5,579,678 A | 12/1996 | Goerndt |
| 5,639,015 A | 6/1997 | Petriekis et al. |
| 5,647,511 A | 7/1997 | Bond |
| 5,678,735 A | 10/1997 | Guglielmini |
| 5,680,959 A | 10/1997 | Ettore et al. |
| 5,697,410 A | 12/1997 | Rutter et al. |
| 5,732,854 A | 3/1998 | Ruben et al. |

(56) References Cited

U.S. PATENT DOCUMENTS

| | | |
|---|---|---|
| 5,749,493 A | 5/1998 | Boone et al. |
| 5,797,524 A | 8/1998 | Lentz |
| 5,884,648 A | 3/1999 | Savage |
| 5,901,761 A | 5/1999 | Rutter et al. |
| 5,941,421 A | 8/1999 | Overman et al. |
| 5,983,964 A | 11/1999 | Zielinksi et al. |
| 6,053,360 A | 4/2000 | Rutter |
| 6,062,413 A | 5/2000 | Redmond |
| 6,073,807 A | 6/2000 | Wilford et al. |
| 6,082,584 A | 7/2000 | Stern |
| 6,116,467 A | 9/2000 | Petriekis et al. |
| 6,131,767 A | 10/2000 | Savage et al. |
| 6,138,878 A | 10/2000 | Savage et al. |
| 6,168,074 B1 | 1/2001 | Petriekis et al. |
| 6,378,730 B1 | 4/2002 | Reddy et al. |
| 6,607,097 B2 | 8/2003 | Savage et al. |
| 6,883,683 B1 | 4/2005 | Cunningham et al. |
| 7,311,231 B2 | 12/2007 | Noell et al. |
| 7,334,702 B2 | 2/2008 | Cunningham et al. |
| 7,641,170 B2 | 1/2010 | Spray et al. |
| 7,721,921 B2 | 5/2010 | Ramusch et al. |
| 7,770,360 B2 | 8/2010 | Smith et al. |
| 7,980,424 B2 | 7/2011 | Johnson |
| 8,052,012 B2 | 11/2011 | Kelly et al. |
| 8,091,864 B2 | 1/2012 | Smith |
| 8,752,734 B2 | 6/2014 | Smith et al. |
| 9,016,505 B2 | 4/2015 | Canegallo |
| 2004/0099687 A1 | 5/2004 | Magermans et al. |
| 2004/0104246 A1 | 6/2004 | Kawaguchi et al. |
| 2005/0269354 A1 | 12/2005 | Smith |
| 2006/0186136 A1 | 8/2006 | Wauters et al. |
| 2007/0034634 A1 | 2/2007 | Brown |
| 2007/0205216 A1 | 9/2007 | Smith |
| 2007/0257067 A1 | 11/2007 | Parmentier et al. |
| 2008/0029540 A1 | 2/2008 | Johnson |
| 2010/0147898 A1 | 6/2010 | Blumenstein et al. |
| 2010/0200613 A1 | 8/2010 | Smith et al. |
| 2010/0206900 A1 | 8/2010 | Dobrusskin et al. |
| 2012/0223095 A1 | 9/2012 | Smith |
| 2013/0037568 A1 | 2/2013 | Smith et al. |
| 2014/0239012 A1 | 8/2014 | Smith et al. |
| 2015/0129612 A1 | 5/2015 | Bellmore et al. |
| 2016/0009462 A1 | 1/2016 | Erickson et al. |
| 2016/0046427 A1 | 2/2016 | Bellmore et al. |
| 2016/0107807 A1 | 4/2016 | Fan et al. |
| 2017/0057736 A1 | 3/2017 | Georgelos et al. |

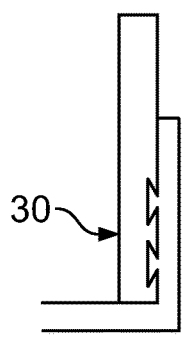
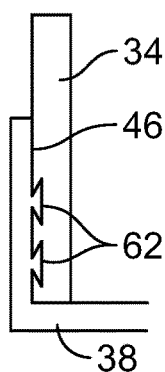
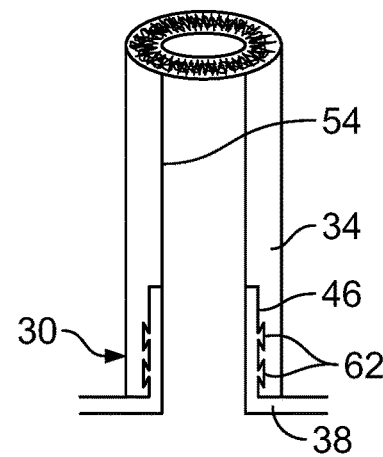
FIG. 4A
FIG. 4B
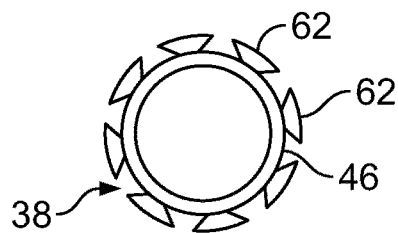
FIG. 5
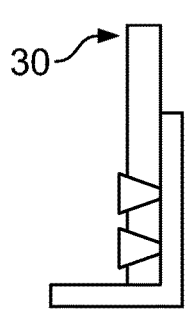
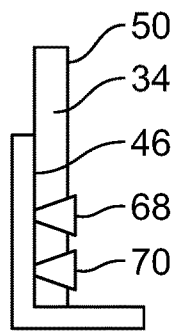
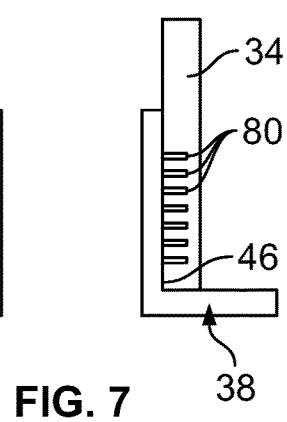
FIG. 6
FIG. 7
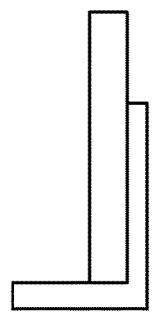
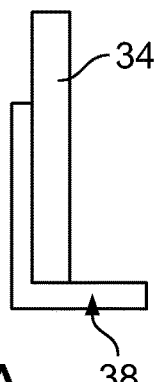
FIG. 8A
FIG. 8B

CO-INJECTION MOLDED DISPENSING COMPONENTS METHOD

RELATED APPLICATIONS

This application is a Divisional of U.S. patent application Ser. No. 15/165,836, filed on May 26, 2016, which is related to, and claims priority to, U.S. Provisional Application No. 62/167,134, filed May 27, 2015. The complete subject matter and contents of U.S. patent application Ser. No. 15/165,836 and U.S. Provisional Application No. 62/167,134 are incorporated herein by reference in their entirety.

BACKGROUND

Generally, this application relates to teachings for producing dispensing components for flexible packaging and specifically for liners designed to be placed inside metal urns that dispense beverages at restaurants and convenience stores.

An example of an urn liner is shown in FIG. 1. The liner 10 is a flexible polyethylene liner or bag with a fitment or spout 14 aligned with a hole in the bag and a soft, flexible tube 18 extending from the fitment 14. The fitment 14 includes a flange 16 that may be connected, for example, by heat sealing, to the inside of the liner bag 10. The spout 14 may further include an adapter 20 connected thereto. The flexible tube 18 is then slidingly inserted onto a lumen extending from the spout 14 or the adapter 20. The bag 10 is placed inside a beverage urn and the flexible tube 18 is inserted into a spigot attached to the urn and extended out the mouth of the spigot. The spigot can be adjusted to a "closed" position in which it pinches the tube 18 shut and prevents the flow of liquid through the tube 18. The spigot can also be adjusted to an "open" position that allows the tube 18 to flex back to its open state such that liquid can flow through the tube 18.

Once the bag 10 is placed in the urn and the tube 18 is inserted into the spigot, the bag 10 is filled with a liquid beverage such as iced tea. The liquid is dispensed through the tube 18 by adjusting the spigot to allow the liquid to flow out of the tube 18. Examples of beverage dispensing systems are shown U.S. Pat. Nos. 6,116,467 and 8,752,734, which are incorporated by reference.

The spout 14 and dispensing tube 18 are typically made of different materials and made separately. The spout 14 and/or adapter 20 of the urn liner is typically made of a stiffer polyethylene that is suitable for being heat sealed to the polyethylene film from which the liner bag 10 is made. The dispensing tube 18, however, is typically made of a more flexible thermoplastic elastomer material such as styrene ethylene butylene styrene (SEBS) or styrene butadiene styrene (SBS). SEBS and SBS are commonly known as Kraton polymers. These elastic materials provide the tube with elastic recovery properties that allow the tube to flex back and recover its shape after being pinched off time and again by the spigot.

It can involve significant production costs to separately extrude a flexible tube and spout out of different materials and then have to assemble the dispensing system by inserting the tube onto the spout or an adapter for the spout.

SUMMARY

Certain embodiments of the present technology relate to a dispensing component for use with an urn liner. The dispensing component includes a spout formed of a polyethylene material and a flexible tube formed of a thermoplastic elastomer material. The spout and tube are formed together as a single component in a mold by co-injection of the polyethylene material and the thermoplastic elastomer material.

The spout may include a barb that retains the flexible tube thereto. The spout may include a flange and/or an adapter that is connected to the flexible tube. The flexible tube may include an inner layer made of a thermoplastic elastomer material and an outer layer that is made of polyethylene. The spout may include an inner cavity that receives a portion of the tube to secure the tube to the spout. The spout may include a portion of a surface that engages the flexible tube that has a rough texture. The spout may include a protrusion, and a portion of the elastomer material of the flexible tube may form around the protrusion such that the flexible tube is connected to the spout.

Certain embodiments of the present technology relate to a dispensing component for use with an urn liner. The dispensing component includes a spout formed of a polyethylene material, a spout adapter formed of a polyethylene material, and a flexible tube formed of a thermoplastic elastomer material. The adapter and the flexible tube are formed together as a single component in a mold by co-injection of the polyethylene material and the thermoplastic elastomer material. The component includes corresponding interlocking mechanisms on the spout and the adapter that connect the adapter and spout to each other.

The adapter may include a barb that retains the flexible tube thereto. The spout may include a flange. The flexible tube may include an inner layer made of a thermoplastic elastomer material and an outer layer that is made of polyethylene. The adapter may include an inner cavity that receives a portion of the tube to secure the tube to the adapter. The texture of at least a portion of the surface of the adapter that engages the flexible tube may be rough. The adapter includes a protrusion, and a portion of the elastomer material of the flexible tube forms around the protrusion such that the flexible tube is connected to the adapter.

Certain embodiments of the present technology relate to a method for making a dispensing component for use with an urn liner. The method includes providing a mold that defines a cavity for forming a spout and a cavity for forming a tube, injecting molten polyethylene into the cavity to form a spout, injecting molten thermoplastic elastomer into the cavity to form a tube, and forming a single component in the mold that includes a polyethylene spout and a thermoplastic elastomeric tube.

The method may further include the step of forming an interconnection between the spout and the tube such as by forming a protrusion or barb on the spout and forming a portion of the tube around the protrusion or barb such in order to secure the tube to the spout. The method may further include the step of forming the tube to have an inner layer made of thermoplastic elastomer and an outer layer made of polyethylene. The method may further include the step of injecting molten thermoplastic elastomer occurs after the polyethylene solidifies in the spout cavity.

Certain embodiments of the present technology relate to a method for making a dispensing component for use with an urn liner. The method includes providing a mold that defines a cavity for forming a spout adapter and a cavity for forming a tube, injecting molten polyethylene into the cavity to form a spout adapter, injecting molten thermoplastic elastomer into the cavity to form a tube, and forming a single component in the mold that includes a polyethylene spout adapter and a thermoplastic elastomeric tube.

The method may further include the step of forming an interconnection between the spout and the tube such as by forming a protrusion or barb on the spout and forming a portion of the tube around the protrusion or barb to secure the tube to the adapter.

Certain embodiments of the present technology relate to a method for assembling a liner for a beverage urn. The method includes providing a plastic bag, providing a dispensing component that includes a spout formed of a polyethylene material and a flexible tube formed of a thermoplastic elastomer material, wherein the spout and tube are formed together as a single component in a mold by co-injection of the polyethylene material and the thermoplastic elastomer material, cutting a hole in the plastic bag, inserting the dispensing component into the hole, and heat sealing the plastic bag to the spout.

Certain embodiments of the present technology relate to a method for assembling a liner for a beverage urn. The method includes providing a plastic bag, providing a spout made of polyethylene, providing a dispensing component that includes a spout adapter formed of polyethylene and a flexible tube formed of thermoplastic elastomer, wherein the spout adapter and tube are formed together as a single component in a mold by co-injection of the polyethylene and the thermoplastic elastomer, cutting a hole in the plastic bag, inserting the spout into the hole, heat sealing the plastic bag to the spout, and connecting the adapter to the spout.

BRIEF DESCRIPTION OF SEVERAL VIEWS OF THE DRAWINGS

FIG. 4a illustrates a cutaway side view of a dispensing component according to certain inventive techniques.

FIG. 4b illustrates a cutaway side view of a dispensing component according to certain inventive techniques.

FIG. 5 illustrates a top view of the spout cylindrical wall shown in FIG. 4A-4B.

FIG. 6 illustrates a cutaway side view of a dispensing component according to certain inventive techniques.

FIG. 7 illustrates a cutaway side view of a dispensing component according to certain inventive techniques.

FIG. 8a illustrates a cutaway side view of a dispensing component according to certain inventive techniques.

FIG. 8b illustrates a cutaway side view of a dispensing component according to certain inventive techniques.

FIG. 25b illustrates a cutaway top view of the component of FIG. 25a.

Figure 1:
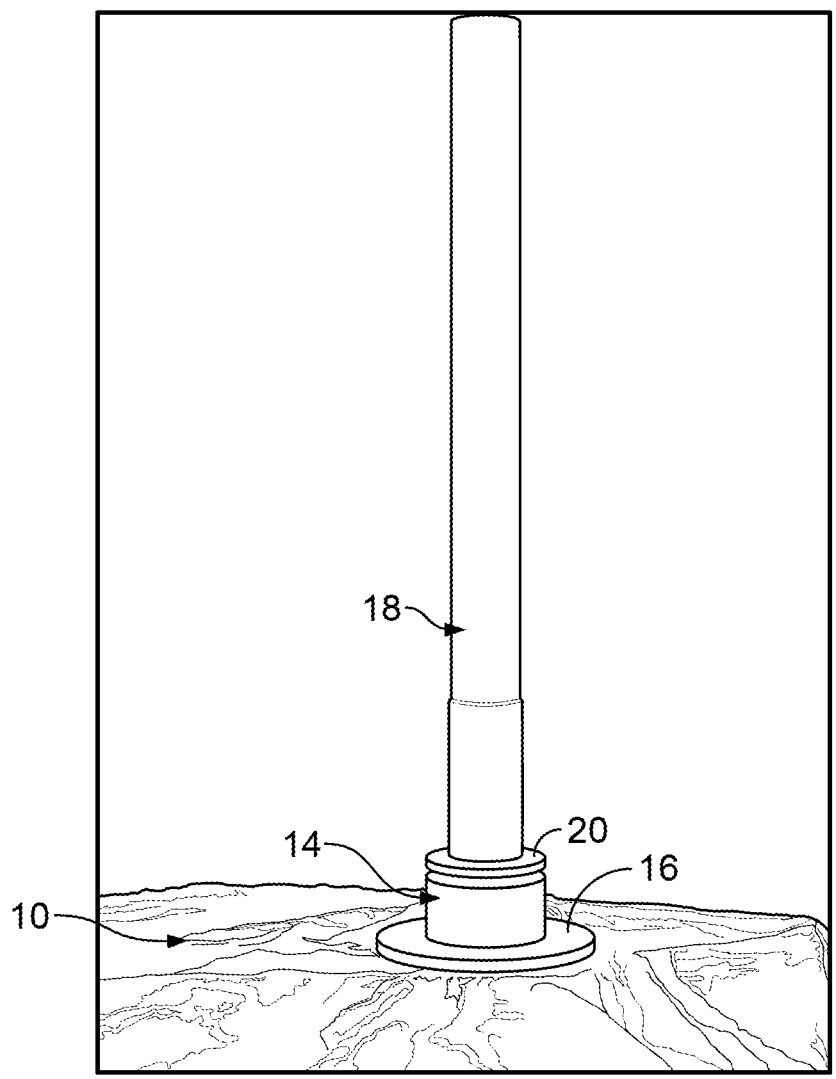
FIG. 1 illustrates a perspective view of a beverage urn liner.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

One embodiment of the present technology includes creating a co-injection molded dispensing component for use with an urn liner. In particular, a single mold is made for both the dispensing tube and the spout and/or spout adapter. The mold includes a cavity for the spout and/or adapter and a cavity for the tube. Polyethylene is injected into the cavity of the mold for the spout and/or adapter to form the spout and/or adapter, and a thermoplastic elastomer such as Kraton is injected into the tube cavity of the mold to form the flexible dispensing tube. The two different materials interlock and/or adhere to each other in the mold such that the structure formed in the mold is a single dispensing component including a spout and/or adapter made of polyethylene and a dispensing tube made of thermoplastic elastomer that is connected to the spout and/or adapter. Alternatively, the thermoplastic elastomer material may be injected into the mold first to form the dispensing tube and then the polyethylene may be injected into the mold to form the spout and/or adapter.

Figure 2:
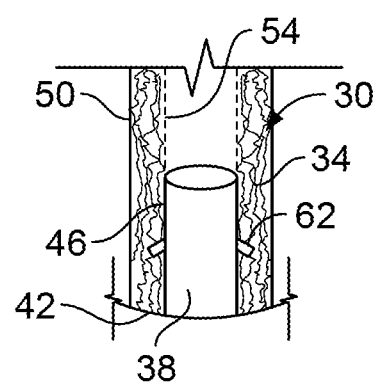
FIG. 2 illustrates a cutaway side view of a dispensing component according to certain inventive techniques.
Figure 3:
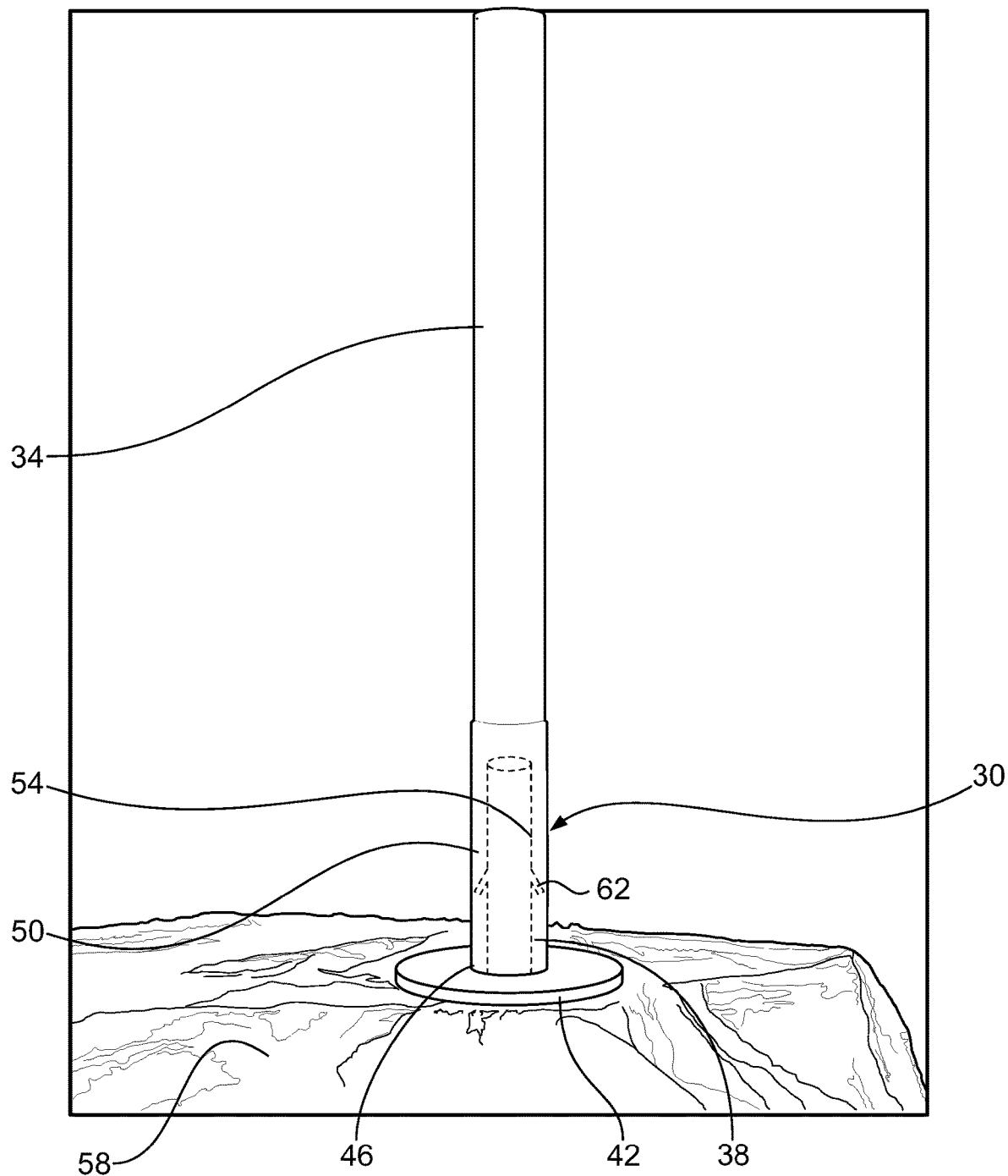
FIG. 3 illustrates perspective view of a beverage urn liner according to certain inventive techniques.

FIGS. 2 and 3 illustrate embodiments of a dispensing component 30 formed from this co-injection molding process. The dispensing component 30 includes a dispensing tube 34 made of a thermoplastic elastomer, such as Kraton, that is formed with a spout 38 made of polyethylene ("PE"). The spout 38 includes a base 42 and a cylindrical wall 46 that are both made of PE. The dispensing tube 34 has a cylindrical wall 50 that defines a bore 54. Because the base 42 of the spout 38 is made of PE, it can be heat sealed or welded to a PE liner bag 58. The spout 38 can be connected to the liner bag 58 by other ways as well. The cylindrical wall 46 of the spout 38 is located inside, and is connected to or bonded with, a portion of the bore 54 of the dispensing tube 34. The cylindrical wall 46 of the spout 38 may include barbs 62 that extend outwardly therefrom to engage the wall 50 of the dispensing tube 34 and secure the dispensing tube 34 to the spout 38. Because the dispensing tube 34 is made of a flexible material like Kraton, it can bend as it is inserted into a curved or angled urn spigot. Additionally, the flexible dispensing tube 34 can be pinched shut by a valve in the urn spigot to stop the flow of liquid from the liner bag in the urn and then flex back to an open state when the valve is disengaged from the tube.

The component 30 can be made by forming the spout 38 component out of PE in the mold first and then, after the spout 38 component solidifies, forming the dispensing tube 34 in the mold out of the elastomer material. In this way, the elastomer material of the dispensing tube 34 solidifies and forms around the barbs 62 of the spout 38 in the mold.

Figure 14:
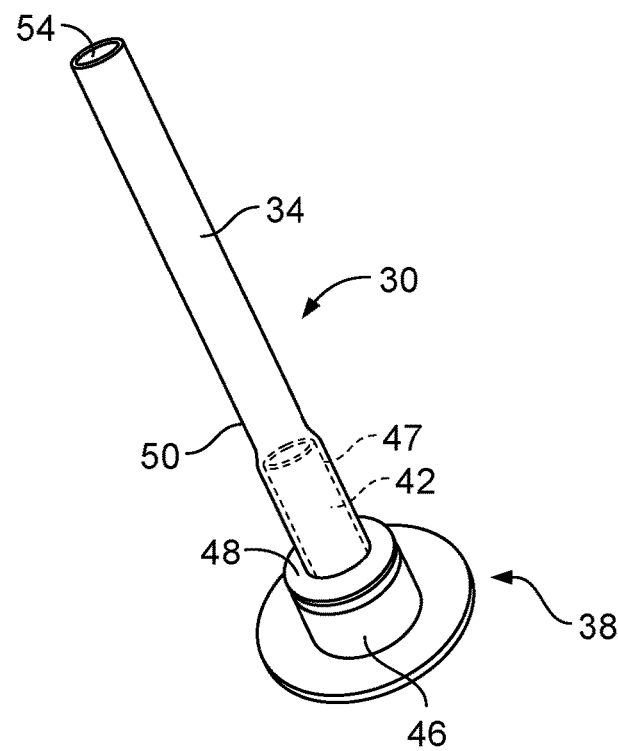
FIG. 14 illustrates a perspective view of a dispensing component according to certain inventive techniques.
Figure 15:
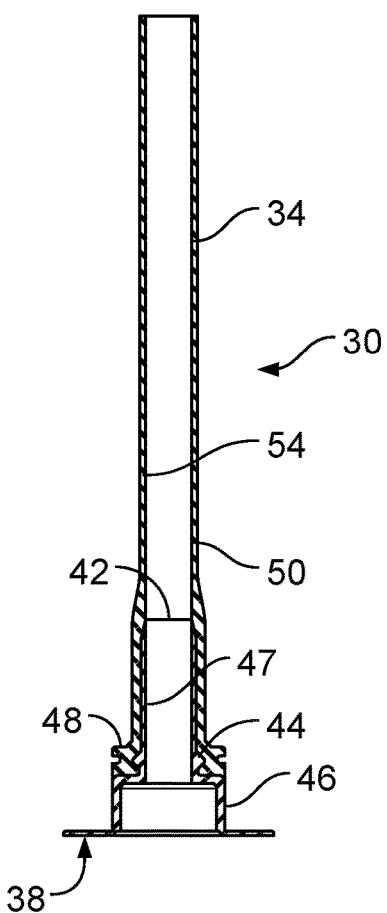
FIG. 15 illustrates a cutaway side view of the dispensing component of FIG. 14.

FIGS. 14 and 15 illustrate another embodiment of a dispensing component 30 formed by the co-injection molding process. The cylindrical wall 46 of the spout 38 includes a cylindrical adapter 42 extending upward therefrom and having a smaller diameter than the cylindrical wall 46. The adapter 42 can be formed with the spout 38 or formed separately from the spout 38 and configured to be connected to the spout 38. The adapter 42 includes a ring 44 extending outwardly therefrom and a cylindrical wall 47. The dispensing tube 34 includes a cylindrical base portion 48 formed with the wall 50 and having a diameter generally the same as the cylindrical wall 46 of the spout 38. The adapter 42 of the spout 38 is located in a portion of the bore 54 of the dispensing tube 34, and the base portion 48 of the tube 34 is formed around the ring 44 of the spout 38 such that the ring 44 secures the tube 34 to the spout 38. The spout 38, adapter 42, and dispensing tube 34 may all be formed together in a mold via a co-injection process. In that regard, the spout 38 and adapter 42 may be formed together with PE in the mold first and then, after the PE solidifies, the dispensing tube 34 may be formed of a thermoplastic material in the mold. In this way, the material of the dispensing tube 34 forms around the ring 44 of the spout 38 and the ring 44 secures the dispensing tube 34 to the spout 38 and adapter 42.

Figure 16:
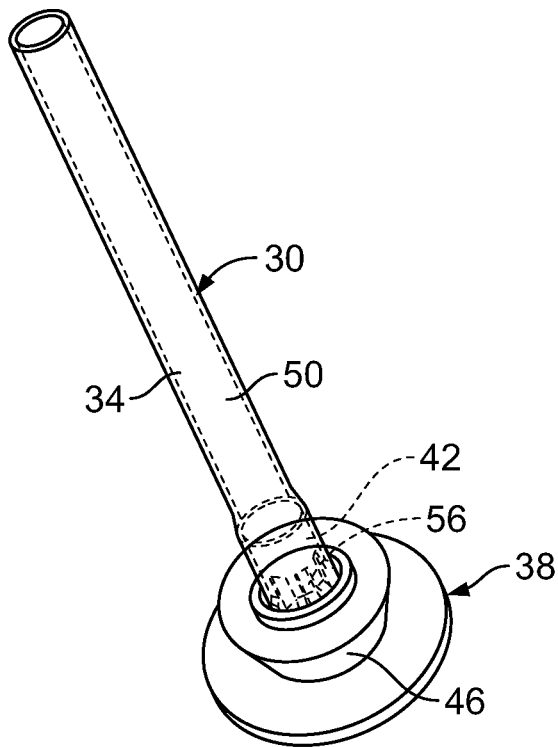
FIG. 16 illustrates a perspective view of a dispensing component according to certain inventive techniques.
Figure 17:
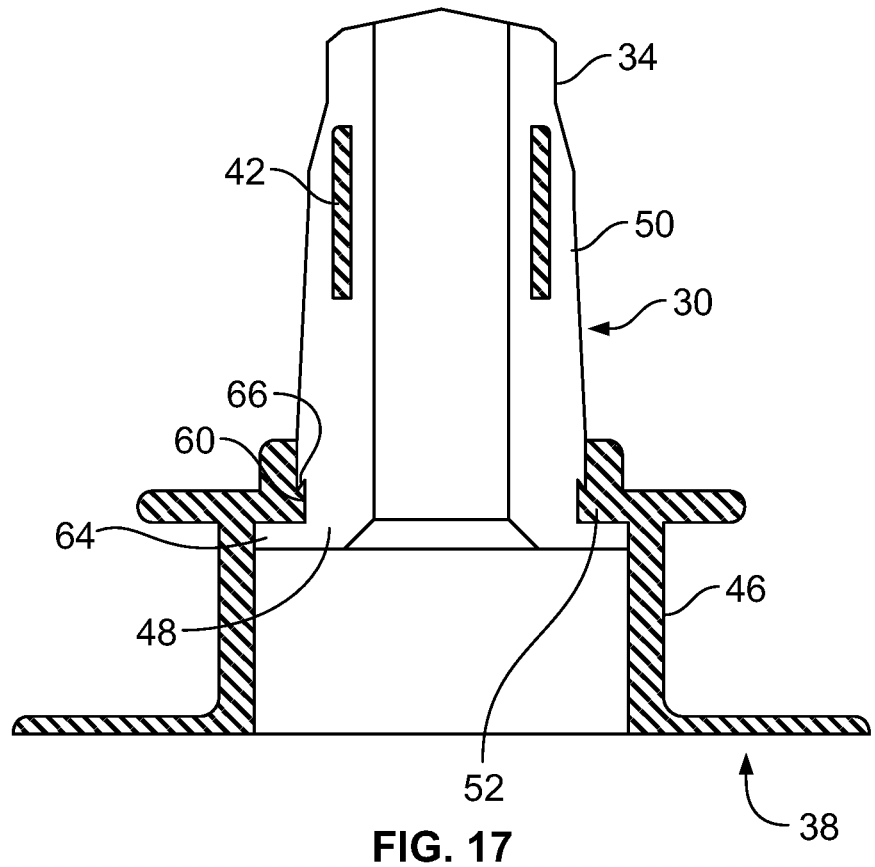
FIG. 17 illustrates a cutaway side view of a portion of the dispensing component of FIG. 16.

FIGS. 16 and 17 illustrate another embodiment of a dispensing component 30 formed by the co-injection molding process. The cylindrical wall 46 of the spout 38 includes an inwardly extending circular lip 52 and an adapter 42 that includes a series of longitudinal slots 56. The base portion 48 of the tube 34 includes a groove 60 defined by a flange 64 and an angled edge 66. The lip 52 of the spout 38 is positioned in the groove 60 of the tube 34, and the wall 50 of the tube 34 is formed inside and outside the adapter 42 and in the slots 56 of the adapter 42. In this way, the tube 34 is secured to the spout 38. The spout 38, adapter 42, and dispensing tube 34 may all be formed together in a mold via a co-injection process. The spout 38 and adapter 42 may be formed together with PE in the mold first and then, after the PE solidifies, the dispensing tube 34 may be formed of a thermoplastic material in the mold. In this way, the material of the dispensing tube 34 forms in the slots 56 of the adapter 42 to secure the tube 34 to the adapter 42.

Due to their different chemical properties, the PE used to make the spout 38 and the thermoplastic elastomer used to make the dispensing tube 34 may not easily adhere to each other during the co-injection molding process. FIGS. 4-12 illustrate different ways in which to interconnect or bond those two different kinds of polymers during the co-injection process that is used to form the component 30. The interconnections shown in FIGS. 4-12 may be used as part of a co-injection molding process to form a dispensing component including forming a PE spout and/or spout adapter with an elastomer dispensing tube. For example, the interconnections shown in FIGS. 4-12 may be used to form the dispensing components 30 shown in FIGS. 2-3 and 14-24.

FIG. 4a shows a cutaway side view of the dispensing component 30 formed in a mold. To make the component 30, molten PE is injected into the mold cavity for the spout to form the spout 38 first. The mold cavity is designed such that as the PE solidifies in the mold cavity, the spout 38 is shaped to include triangular barbs 62 extending outwardly from the cylindrical wall 46. FIG. 5 shows a top view of just the cylindrical wall 46 of the spout 38 with the barbs 62 extending out from the wall 46. After the PE solidifies, molten thermoplastic elastomer material ("TPE") such as Kraton is then injected into the mold cavity for the dispensing tube to form the tube 34. Some of the TPE material forms the portion of the tube 34 that surrounds the cylindrical wall 46 of the spout 38. As that TPE material solidifies around the barbs 62, the elastomer material of the dispensing tube 34 becomes interlocked with the PE spout 38. In this way, the dispensing component 30 released from the mold is a single structure having a PE spout 38 and a flexible TPE tube 34.

FIG. 4b shows a variation of the dispensing component 30 shown in FIG. 4a in which the dispensing tube 34 is formed to overlap the top of the cylindrical wall 46 of the spout 38 so that the cylindrical wall 46 and the dispensing tube 34 form a bore having a generally uniform inner diameter. In this way, the component 30 does not include a "step" formed by the wall 46 and bore 54 of the tube 34, which provides a more streamlined flow path through the component 30. In addition, by insetting the cylindrical wall 46 of the spout 38 in the dispensing tube 34 as shown in FIG. 4b, the cylindrical wall 46 of the spout 38 can have a smaller diameter, which allows for the spout 38 to more easily fit into an opening in the urn vessel wall when the dispensing tube 34 is positioned in a dispensing valve.

FIG. 6 illustrates another kind of barb structure on the spout 38 that can be used to interconnect the TPE material of the dispensing tube 34 to the PE material of the spout 38 as part of a co-injection mold process for forming a dispensing component 30. Specifically, the spout 38 of FIG. 6 includes tapered barbs 68 that extend further outward from the cylindrical wall 46 than the barbs 62 of the spout 38 of FIGS. 4-5. The spout 38 is formed first in the mold out of PE, and, then, after the spout 38 solidifies, the dispensing tube 34 is formed in the mold out of TPE. The long barbs 68 of the spout 38 extend out beyond the wall 50 of the dispensing tube 34 after the TPE material of the tube 34 solidifies about the cylindrical wall 46 of the spout 38. The wide heads 70 of barbs 68 operate similarly to nail heads to help hold the tube wall 50 against the spout wall 46.

FIG. 7 illustrates another kind of interlocking structure that can be used to connect the TPE material of the dispensing tube 34 to the PE material of the spout 38 as part of a co-injection mold process for forming a dispensing component 30. Specifically, the spout 38 of FIG. 7 includes several flat prongs 80 that extend outward from the cylindrical wall 46. The spout 38 is formed first in the mold out of PE, and, then, after the spout 38 solidifies, the dispensing tube 34 is formed in the mold out of TPE. When the TPE material of the dispensing tube 34 solidifies about the cylindrical wall 46 of the spout 38 during the co-injection process, the prongs 80 hold the dispensing tube 34 in place against the cylindrical wall 46 of the spout 38 and help prevent the tube 34 from being pulled off of the spout 38 in the direction of Arrow A.

FIGS. 8a and 8b illustrate ways to connect the dispensing tube 34 and spout 38 during the co-injection process without forming barbs or other connecting structures on the spout 38. In these embodiments, the two different polymers chosen to form the spout 38 and the dispensing tube 34 have an affinity for each other that allows them to chemically bond at the molecular level as the two different polymers solidify in the mold. For example, the spout 38 may be made of PE and the dispensing tube 34 may be made out of both TPE and a third material that helps the TPE tube 34 better adhere to or bond with the PE of the spout 38. Such a suitable adhesive or compatibilizing resin may include Kraton G1657, Dupont Bynel 3810, Bynel E418 and Bynel 3859 and Bynel 41E865. By way of example only, the dispensing tube 34 may be made up of up to 35% of the third resin with the remainder of the tube being made of TPE.

FIGS. 9-12 illustrate other embodiments that include forming a portion of the TPE material of the dispensing tube 34 in an internal portion of the PE spout 38 as part of the co-injection molding process. By forming the dispensing component 30 in this way, the spout 38 and/or its adapter can be smaller and, therefore, less expensive to produce. A shorter or smaller spout 38 also allows for the spout 38 and/or adapter to be positioned closer to the opening in the metal urn when the liner to which the spout 38 is attached is placed in the urn, which makes it easier to dispense the liquid contents of the liner in the urn.

Figure 9:
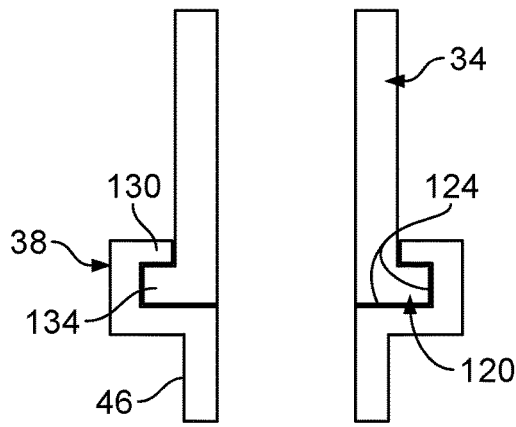
FIG. 9 illustrates a cutaway side view of a dispensing component according to certain inventive techniques.

Referring to FIG. 9, the cylindrical wall 46 of the spout 38 is formed to include an annular cavity 120 having a rough inner surface 124. The top of the cavity 120 is defined by an inwardly extending circular lip 130. After the spout 38 is formed of PE in the mold, the molten TPE is injected into the mold to form the dispensing tube 34, and a portion of the TPE material is directed into the annular cavity 120 of the spout 38 and solidifies to form an annular flange 134 in the cavity 120. The rough nature of the inner surface 124 of the cavity 120 facilitates adhesion of the TPE to the inner surface 124 of the cavity 120, and the lip 130 secures the flange 134 of the dispensing tube 34 in the cavity 120 in order to create an interlocking connection between the spout 38 and the dispensing tube 34.

Figure 10:
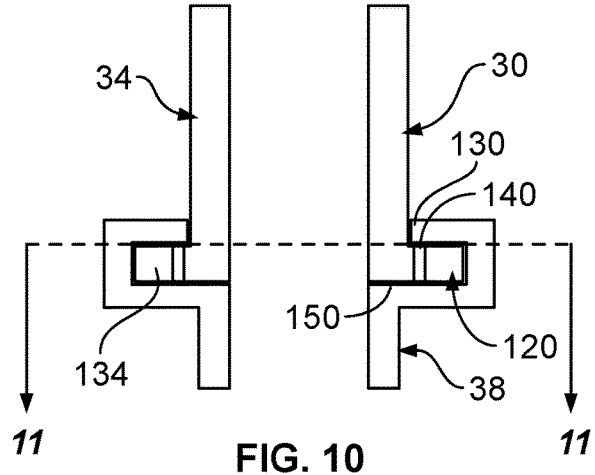
FIG. 10 illustrates a cutaway side view of a dispensing component according to certain inventive techniques.
Figure 11:
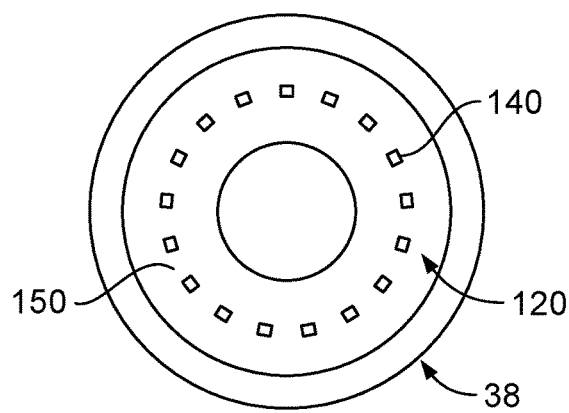
FIG. 11 illustrates a cross-sectional top view of the spout of FIG. 10 taken along lines 11-11.

FIGS. 10 and 11 illustrate an embodiment of the dispensing component 30 similar to that shown in FIG. 9. FIG. 10 is a cutaway side view of the component 30 and FIG. 11 is a cross-sectional top view of the spout 38. The spout 38 shown in FIGS. 10 and 11 further includes a series of vertical posts 140 radially positioned in the cavity 120 and extending from a base 150 of the cavity 120 to the lip 130. The posts 140 can be round or square or any number of other shapes. Any number of posts 140 can be used in the cavity 120. The posts 140 may also have rough surfaces to facilitate adhesion of the TPE material of the dispensing tube 34 to the posts 140. The posts 140 provide additional structure about which the molten TPE of the dispensing tube 34 can solidify. The posts 140, therefore, further help retain the flange 134 of the dispensing tube 34 in the cavity 120.

Figure 12:
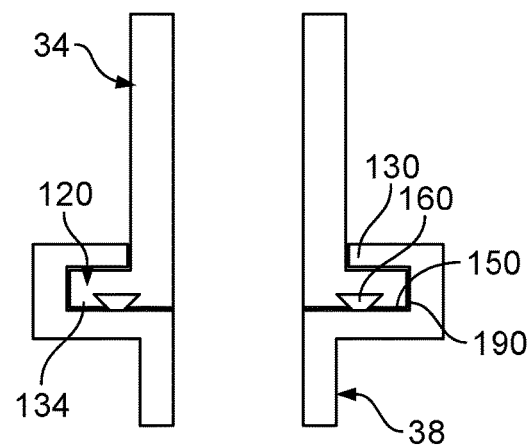
FIG. 12 illustrates a cutaway side view of a dispensing component according to certain inventive techniques.

FIG. 12 illustrates another embodiment similar to that shown in FIG. 9. The spout 38 shown in FIG. 12 further includes triangular barbs 160 positioned on the base 150 of the cavity 120. The barbs 160 can have any number of different shapes. Alternatively, the barbs 160 can extend downward into the cavity 120 from the bottom of the lip 130, inward into the cavity 120 from a side wall 190, or any combination of upward, downward, and inward into the cavity 120. The barbs 160 may also have a rough outer surface to facilitate adhesion to TPE. Once the molten TPE solidifies around the barbs 160 during the co-injection molding process, the barbs 160 help retain the flange 134 of the solidified TPE dispensing tube 34 in the cavity 120 of the spout 38.

Figure 13:
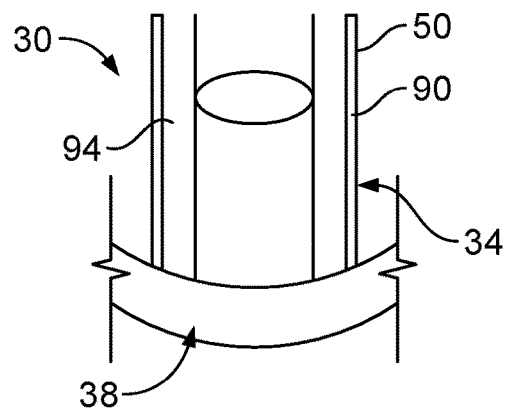
FIG. 13 illustrates a cutaway perspective view of a dispensing component according to certain inventive techniques.

FIG. 13 illustrates another embodiment of the present technology in which the outer wall 50 of the dispensing tube 34 is formed with a thin outer layer 90 of polyethylene. The thermoplastic elastomeric polymers from which the dispensing tube 34 is made can be tacky, which can make it difficult to slide the dispensing tube 34 into a plastic spigot without the tube 34 sticking or kinking during the insertion process. By adding a polyethylene layer that has an erucamide slip characteristic to the outside of the tube wall 50, the tube 34 can more easily be inserted into and slid through the spigot.

The mold for making the dispensing component 30 shown in FIG. 13 can be configured such that, during the co-injection process, polyethylene is injected into the mold to form the spout 38 and a thin outer layer 90 of the wall 50 of the dispensing tube 34. The TPE can then be injected into the mold to form an interior portion 94 of the wall 50 of the dispensing tube 34. Alternatively, the PE can be injected into the mold to form the spout 38, and after the PE solidifies, the TPE can then be injected into the mold to form the inner portion 94 of the dispensing tube 34. After the TPE solidifies, PE can be injected into the mold to form the thin outer layer 90 of the tube wall 50. With respect to any of these methods for adding a polyethylene outer layer 90 to the dispensing tube 34, the TPE and PE materials can be interconnected or bonded to each other by methods similar to those disclosed above with respect to FIGS. 4-12 and elsewhere herein.

In another embodiment of the present technology, the TPE material used to form the dispensing tube 34 can include a slip additive. In such a case, the dispensing component 30 is formed by injecting the mold with the PE to form the spout 38 and then, after the PE solidifies, injecting the mold with the TPE that includes a slip additive to form the dispensing tube 34. The resulting solidified dispensing component 30 includes a tube 34 having the characteristics associated with the slip additive.

In order to have the surface properties to slide through the spigot, the outer surface of the dispensing tube 34 of the different embodiments preferably has a kinetic coefficient of friction in the range of 0.05 to 0.9.

The co-injection molded dispensing component of the present technology may include using a linear low density polyethylene ("LLDPE") polymer such as Dow Dowlex 2045 to create the spout and/or spout adapter and a rubbery metallocene plastomer polyethylene to create the dispensing tube. An example of such a rubbery polyethylene is Dow Affinity EG8100G or Versify 2200.

The co-injection molded dispensing components of the present technology can be used to assemble urn liners in different ways. For example, and with reference to FIGS. 18-20, a dispensing tube 34 made of TPE and a spout 38 made of PE can be formed as a single dispensing component 30 via co-injection molding and then, during assembly of an urn liner, the single dispensing component 30 can be inserted in the direction of arrow A into a pre-cut hole 104 in the liner bag 108. The PE flange 42 of the spout 38 can be positioned against the liner bag 108 and sealed to the PE liner bag 108 with a cylindrical heat sealing or welding component 100 that is lowered over and around the tube 34 and that has a base 112 that engages the bag 108 above the flange 42 to heat seal or weld the bag 108 to the flange 42. By way of example, the dispensing tube 34 can be connected to the spout 38 using any of the interconnections shown in FIGS. 4-12.

Figure 18:
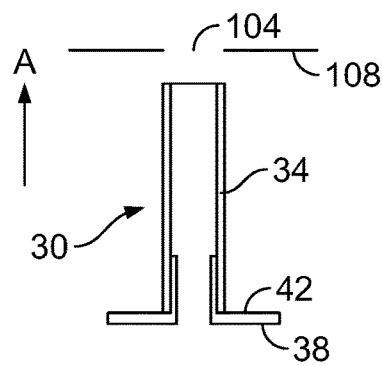
FIG. 18 illustrates a cutaway side view of a dispensing component being assembled with a liner according to certain inventive techniques.
Figure 19:
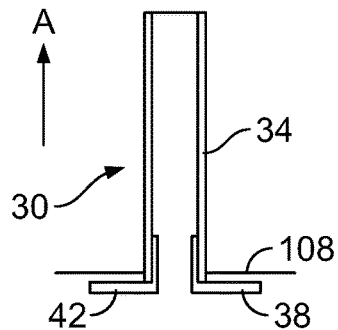
FIG. 19 illustrates a cutaway side view of a dispensing component being assembled with a liner according to certain inventive techniques.
Figure 20:
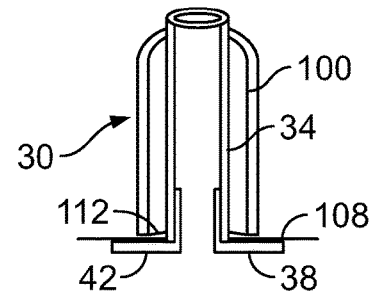
FIG. 20 illustrates a cutaway side view of a dispensing component being assembled with a liner according to certain inventive techniques.
Figure 21:
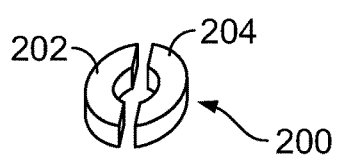
FIG. 21 illustrates a perspective view of a heat sealing component according to certain inventive techniques.
Figure 22:
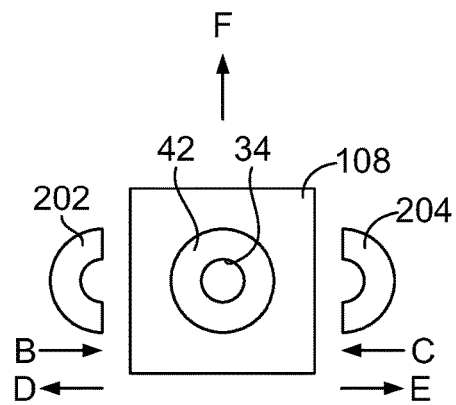
FIG. 22 illustrates a plan view of a dispensing component being assembled with a liner according to certain inventive techniques.

With respect to FIGS. 21 and 22, a heat sealing component 200 having two pieces, i.e., two half cylinders 202 and 204, can be used to seal the dispensing component 30 shown in FIGS. 18-20 to the bag 108. The half cylinders 202 and 204 can be moved laterally proximate to each other in the directions of arrows B and C on opposite sides of the tube 34 during assembly of the tube 34 to the bag 108 and heating components on the bottoms of the half-cylinders 202 and 204 seal the bag 108 to the flange 42. The half-cylinders 202 and 204 are then laterally moved away from each other in the direction of arrows D and E so that the assembled bag 108 and tube 34 can be moved further on down the assembly line in the direction of Arrow F and another bag 108 and flange 42 assembly can be moved into place in order for the heat sealing component 200 to seal the bag 108 to the flange 42. Because the two-piece heat sealing component 200 does not have to be lowered down along the length of the dispensing tube 34 like the heat sealing component 100 shown in FIG. 20, the heating sealing component 200 can be shorter than the heat sealing component 100 and does not require a long vertical stroke as part of the sealing process.

Figure 23:
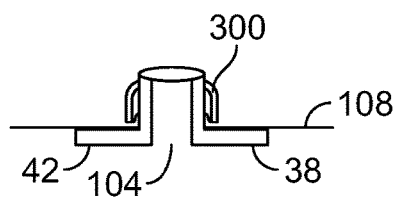
FIG. 23 illustrates a cutaway side view of a dispensing component being assembled with a liner according to certain inventive techniques.
Figure 24:
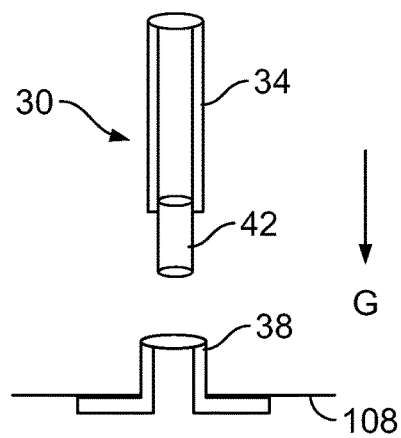
FIG. 24 illustrates a cutaway side view of a dispensing component being assembled with a liner according to certain inventive techniques.

Alternatively, and with reference to FIGS. 23-24, a dispensing tube 34 made of TPE and an adapter 42 made of PE can be formed as a single dispensing component 30 via co-injection molding and a separate spout 38 can be made of PE. By way of example, the dispensing tube 34 can be formed to be connected to the adapter 42 using any of the interconnections shown in FIGS. 4-12. During assembly of an urn liner, the spout 38 can be inserted into a pre-cut hole 104 in the liner bag 108. The PE flange 42 of the spout 38 is positioned against the liner bag 108 and sealed to the PE liner bag 108 with a heat sealing or welding component 300. Because the spout 38 is shorter than the assembled dispensing component 30, the heat sealing component 300 can be shorter than the heat sealing component 100 one used to seal the spout 38 shown in FIGS. 18-20 and requires a shorter vertical stroke to perform the sealing step. After the spout 38 is sealed to the bag 108, the component 30 can then be moved downward in the direction of Arrow G in order to connect the adapter 42 to the spout 38. In this way, the co-injection molded component 30 is connected to the spout 38. By way of example, the adapter 42 can be snapably connected to the spout 38 by an interlocking or interconnecting mechanism; however, the adapter 42 can be connected to the spout 38 in any number of other ways.

Figure 25A:
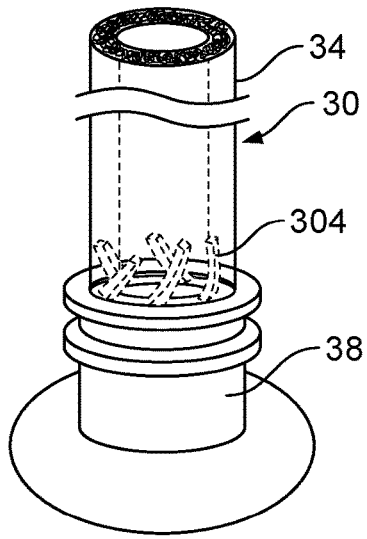
FIG. 25a illustrates a perspective view of a dispensing component according to certain inventive techniques.
Figure 25B:
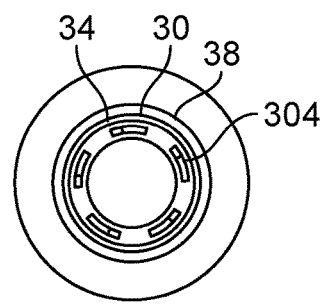

FIGS. 25a-25b illustrate another way to form a single dispensing component 30 via the co-injection molding process. The spout 38 includes a series of prongs 304 that are encapsulated in the TPE material of the dispensing tube 34. The component 30 is formed by injecting PE into the mold cavity for the spout to form the spout 38 and the prongs 304 that extend from the spout 38. The dispensing tube 34 is then formed by injecting TPE into the mold cavity for the tube and the TPE solidifies around the prongs 304 such that the TPE dispensing tube 34 is secured to the PE spout 38.

Figure 28:
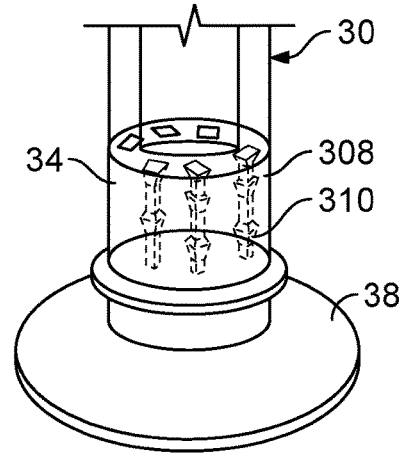
FIG. 28 illustrates a cutaway perspective view of a dispensing component according to certain inventive techniques.
Figure 29:
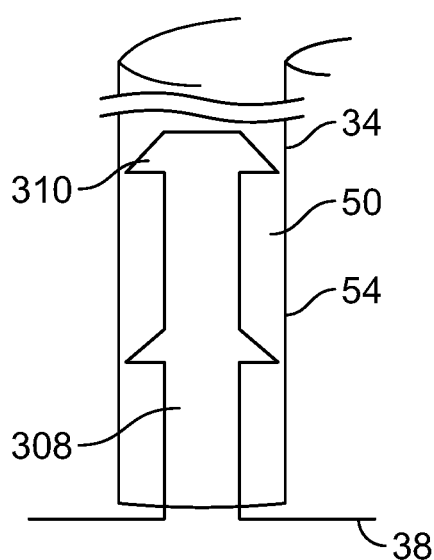
FIG. 29 illustrates a cutaway side view of a dispensing component according to certain inventive techniques.
Figure 30:
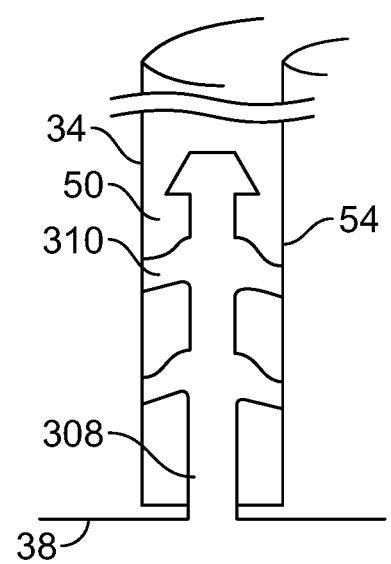
FIG. 30 illustrates a cutaway side view of a dispensing component according to certain inventive techniques.

FIG. 28 illustrates another way to form a single dispensing component 30 via the co-injection molding process. The spout 38 includes a series of vertical prongs 308 that are encapsulated in the TPE material of the dispensing tube 34. The component 30 is formed by injecting PE into the mold cavity for the spout to form the spout 38 and the prongs 308 that extend from the spout 38. The dispensing tube 34 is then formed by injecting TPE into the mold cavity for the tube and the TPE solidifies around the prongs 308 such that the TPE dispensing tube 34 is secured to the PE spout 38. The prongs 308 have surface irregularities, such as rectangular barbs 310, encapsulated in the TPE of the dispensing tube 34 that secure the tube 34 to the spout 38. As shown in FIGS. 29 and 30, the barbs 308 may be completely encapsulated in the wall 50 of the dispensing tube 34 or may be partially exposed and flush with the wall 50 and bore 54 of the dispensing tube 34.

The barbs 304 and 308 of FIGS. 25 and 28-30 may be used with the annular cavity of the embodiments shown in FIGS. 9-12 to secure the TPE dispensing tube 34 to the PE spout 38. The dispensing tube 34 of the embodiments in FIGS. 25 and 28-30 may also be formed with an outer PE layer by an extrusion or co-injection process.

Figure 26:
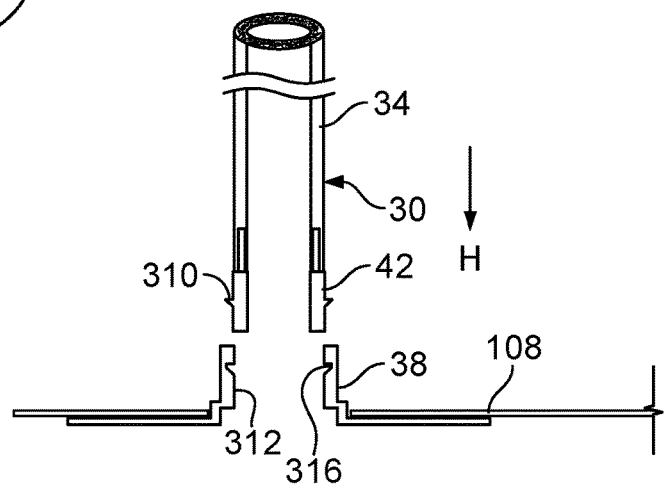
FIG. 26 illustrates a cutaway side view of a dispensing component being assembled according to certain inventive techniques.
Figure 27:
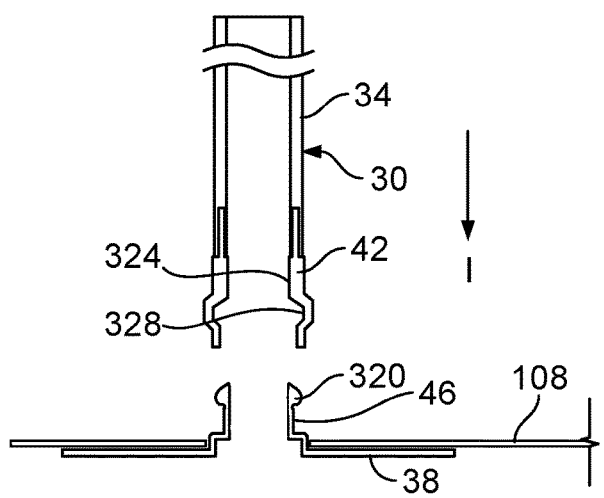
FIG. 27 illustrates a cutaway side view of a dispensing component being assembled according to certain inventive techniques.

FIGS. 26-27 show different ways to snapably connect the adapter 42 to the spout 38 after the spout 38 is sealed to a liner bag 108. FIG. 26 illustrates a spout 38 sealed to a liner bag 108 and a dispensing component 30 that includes a dispensing tube 34 formed with an adapter 42 via the co-injection molding process of the present technology. The adapter 42 includes barbs 310 extending outwardly therefrom, and the bore 312 of the spout 38 includes recesses 316 that are shaped to receive the barbs 310 of the adapter 42. Accordingly, the adapter 42 is connected to the spout 38 by moving the adapter 42 downward in the direction of Arrow H and inserting the adapter 42 into the bore 312 of the spout 38 such that the barbs 310 are snapably received in the recesses 316.

FIG. 27 illustrates a spout 38 sealed to a liner bag 108 and a dispensing component 30 that includes a dispensing tube 34 formed with an adapter 42 via the co-injection molding process of the present technology. The cylindrical wall 46 of the spout 38 includes barbs 320 extending outwardly therefrom, and the bore 324 of the adapter 42 includes recesses 328 that are shaped to receive the barbs 320 of the spout 38. Accordingly, the adapter 42 is connected to the spout 38 by moving the bore 324 of the adapter 42 downward in the direction of Arrow I along the cylindrical wall 46 of the spout 38 such that the barbs 320 are snapably received in the recesses 328. A dispensing tube 34 shown in the embodiments of FIGS. 18-29 can be made of two different materials like the tube 34 shown in FIG. 13. That is to say, the dispensing tube 34 in those embodiments can have an inner layer that is made of an elastomer material and an outer layer that includes an erucamide slip characteristic.

While the embodiments discussed above involve first injecting the polyethylene into the mold to form the spout and then injecting the TPE into the mold to form the tube around the more rigid material of the spout, it will be understood that the process for making a dispensing component including a spout and tube could be done the other way around, i.e., the TPE material is injected first to form the tube, and then the polyethylene is injected to form the spout around the softer TPE material.

Another embodiment of the co-injection molded dispensing component of the present technology includes using a random ethylene polypropylene copolymer to create the spout and a rubbery metallocene plastomer polyethylene to create the tube. These polypropylenes are well known as polymers that can be heat sealed to PE-based films.

The embodiments disclosed herein are not limited to the specific polymers or materials discussed with respect to those embodiments. Any number of different kinds of polymers having different properties can be used with the embodiments disclosed herein. Also, the embodiments disclosed herein are not limited just to a spout/tube component for use with an urn liner. The co-injection process of the different embodiments can be used to make other dispensing components and assemblies that include at least two different sub-components that are made of different kinds of polymers having different desired properties.

The embodiments of the present technology allow for the production of a single dispensing component for use with an urn liner bag. The single dispensing component includes a spout made of a stiffer polyethylene material that can be sealed to the liner bag and a dispensing tube made of a flexible material. Forming a single molded component out of different materials in one step involves lower production costs than molding two separate spout and tube components and then assembling the components.

In addition, by forming the dispensing tube with the cylindrical wall of the spout or spout adapter via co-injection molding, the outer diameter of the cylindrical wall can be reduced. That is because a separate flexible dispensing tube does not have to be press fit onto the cylindrical wall. When a flexible dispensing tube has to be press fit onto the cylindrical wall, the inner diameter of the dispensing tube typically is smaller than or the same as the outer diameter of the cylindrical wall. Thus, when the dispensing tube is press fit onto the cylindrical wall, the outer diameter of the portion of the dispensing tube that is surrounding the cylindrical wall expands and is greater than the outer diameter of the rest of the dispensing tube. This expanded portion of the dispensing tube may not fit into the opening in the urn that leads to the spigot. As such, the dispensing tube does not extend all the way into the opening or fit snugly into the opening, which may affect dispensing of liquid from the bag and which requires a longer dispensing tube. By forming the dispensing tube and the cylindrical wall of the spout together by co-injection molding, a press fit is not required and, thus, the outer diameter of the cylindrical wall can be reduced.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for assembling a liner for a beverage urn, comprising:
   providing a plastic bag;
   providing a dispensing component that includes a spout formed of a polyethylene material and a flexible tube formed of a thermoplastic elastomer material, wherein the spout and tube are formed together as a single interconnected component in a mold by co-injection of the polyethylene material and the thermoplastic elastomer material such that the spout includes a protrusion that is retained within a cavity formed in the tube;
   cutting a hole in the plastic bag;
   inserting the dispensing component into the hole; and
   heat sealing the plastic bag to the spout.

2. A method for assembling a liner for a beverage urn, comprising:
   providing a plastic bag;
   providing a spout made of polyethylene;
   providing a dispensing component that includes a spout adapter formed of polyethylene and a flexible tube formed of thermoplastic elastomer, wherein the spout adapter and tube are formed together as a single component in a mold by co-injection of the polyethylene and the thermoplastic elastomer such that the spout adapter includes a protrusion that is retained within a cavity formed in the tube;
   cutting a hole in the plastic bag;
   inserting the spout into the hole;
   heat sealing the plastic bag to the spout; and
   connecting the adapter to the spout.

3. A method for assembling a liner for a beverage urn, comprising:
   providing a plastic bag;
   providing a dispensing component that includes a spout formed of a polyethylene material and a flexible tube formed of a thermoplastic elastomer material, wherein the spout and tube are formed together as a single interconnected component in a mold by co-injection of the polyethylene material and the thermoplastic elastomer material such that the tube includes a protrusion that is retained within a cavity formed in the spout;
   cutting a hole in the plastic bag;
   inserting the dispensing component into the hole; and
   heat sealing the plastic bag to the spout.

4. A method for assembling a liner for a beverage urn, comprising:
   providing a plastic bag;
   providing a spout made of polyethylene;
   providing a dispensing component that includes a spout adapter formed of polyethylene and a flexible tube formed of thermoplastic elastomer, wherein the spout adapter and tube are formed together as a single component in a mold by co-injection of the polyethylene and the thermoplastic elastomer such that the tube includes a protrusion that is retained within a cavity formed in the spout adapter;
   cutting a hole in the plastic bag;
   inserting the spout into the hole;
   heat sealing the plastic bag to the spout; and
   connecting the adapter to the spout.

* * * * *